March 11, 1930.   R. ERBAN   1,750,168
FRICTION GEAR
Filed June 7, 1928
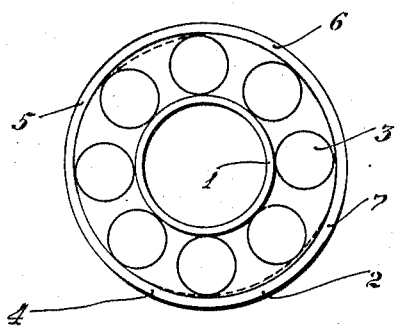
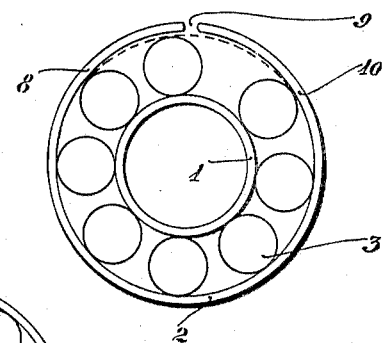
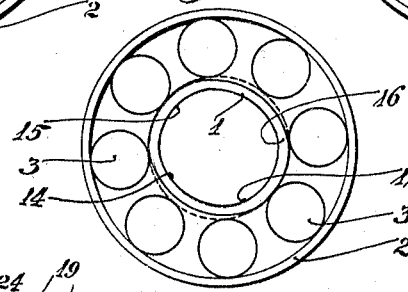
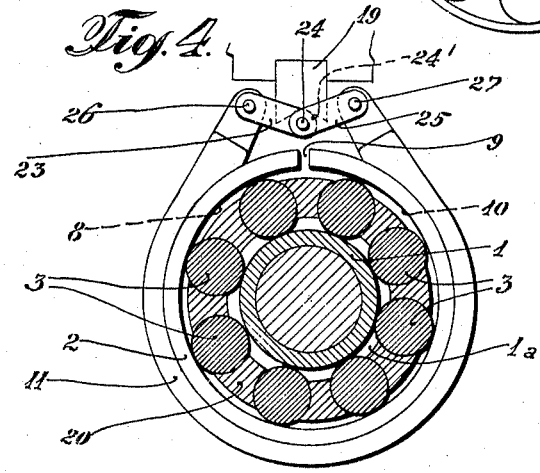
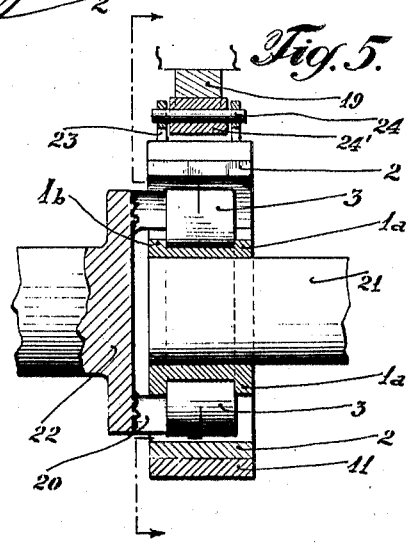
INVENTOR
Richard Erban
BY
his ATTORNEY Patented Mar. 11, 1930

1,750,168

UNITED STATES PATENT OFFICE

RICHARD ERBAN, OF VIENNA, AUSTRIA

FRICTION GEAR

Application filed June 7, 1928, Serial No. 283,580, and in Austria June 7, 1927.

My invention has reference to friction gears comprising a plurality of rolling bodies, e. g., rollers disposed between two or more race-rings which are pressed against the rollers either by a contraction of the outer race-ring, or an expansion of the inner race-ring.

To this end, it has already been proposed to split one of the race-rings and, in order to prevent jarring of the rollers as they pass over the open joint, make the cut oblique relative to the axis of the gear, or give the cut dovetail shape. Yet, the action of the open joint on the rollers is still so great, that at a high rate of revolution the gear is destroyed within a very short time.

To prevent this drawback is the object of the present invention, according to which the race-rings are given a shape slightly deviating from circular shape, as for instance an approximately oval shape. Because of this special shape of one of the race-rings, the rollers are at least once during each revolution entirely or practically entirely relieved. If the race-rings are not split, the race-rings are pressed against the rollers by the deformation of the elastic race-ring, whereas if the race-rings are split, the open joint can be provided in the zone where the rollers are relieved so that they will pass the joint while not bearing any load.

The guiding of the rollers can be effected by lateral flanges in the same manner as in the ordinary roller bearings, the action of the guiding flanges being based on this that during each revolution the rollers are once relieved in which case they can easily assume the correct position.

In the annexed drawing, in which I have shown, by way of illustration, several embodiments of the invention, Figs. 1, 2 and 3 are diagrammatic views of various roller bearings, Fig. 1 showing a circular inner race-ring and an outer elastic race-ring slightly deviating from circular shape, Fig. 2 being a similar view as Fig. 1 showing a split outer race-ring and Fig. 3 being a similar view as Fig. 1 showing a circular outer and a slightly deformed inner race-ring. Figs. 4 and 5 are respectively a transverse section and a longitudinal section of a roller bearing provided with a split outer race-ring slightly deviating from circular shape, and tensioning means. In the diagrammatic view of Fig. 1, 1 is the circular inner race-ring, 2 the outer race-ring, and 3 are the rolling bodies. The outer race-ring has elliptical shape, being pressed with its portions 4—5 and 6—7 against the rolling bodies 3, the portions 5—6 and 4—7 deviating from the circular shape as indicated in Fig. 1 by the broken lines. For the purpose of increasing the deviation from the circular shape, the race-ring can be initially ground in the shape of an ellipsis, or according to one concentric circle and two eccentric circles. As will clearly appear from Fig. 1, when the rolling bodies 3 pass the portions 5—6 and 4—7, they are completely or substantially completely relieved, and therefore the cylindrical rollers can be guided by lateral flanges or edges along the inner or outer race-ring as in the well-known roller bearings.

In the modification shown in Fig. 2, 1 is the inner race-ring and 2 the outer ring which, as shown, is of approximately oval shape and is split at 9. The deviation of ring 2 from the circular shape extends from 8—10, and as the rollers, indicated at 3, pass over this portion, they are relieved, and consequently there will be no jarring as they pass over the open joint 9.

In the modification shown in Fig. 3, in which the two race-rings are also designated 1 and 2, the inner ring 1 is shown deformed, its portions 14—15 and 16—17 being pressed against the rolling bodies, while the portions 15—16 and 14—17 relieve the pressure.

Figs. 4 and 5 give an illustration of the manner of deformation of one of the rings. In said two figures, the circular inner race-ring 1 is shown fast on a shaft 21 and is provided with flanges 1$^a$ and 1$^b$ forming a path for the rolling bodies 3 which are guided in the cage 20 secured to, or formed integrally with, another shaft 22. 2 is the outer ring, which is split as shown at 9 (corresponding to Fig. 2) and is contracted by the torque transmitted from one shaft to the other. At 11 is shown a tensioning member surrounding the ring 2 and adapted to be tensioned by means of a toggle joint 23, 24, 25 which is pivotally connected with the ends of the tensioning member at 26 and 27. The centre pivot 24 of the toggle joint is guided in a dovetailed part 19 having a fixed position in the casing (not shown), while the outer ring 2 and the tensioning member 11 are freely movable therein. As soon as a torque is exerted on ring 2, the inclined faces of the dove-tailed part 19 will exert pressures having a component acting radially inwards on the center pivot 24 of the toggle joint, whereby the tensioning member 11 is tensioned with the result that the ring 2 is pressed against the rollers 3 and the latter are pressed against the inner ring 1.

The deformation of either the inner or outer ring is, of course, very slight, the drawing giving an exaggerated picture for the purpose of illustration.

With the dimensions as shown and an angle of the toggle joint of 1:5 the angle of the inclined face of the part 19 is 30°.

I claim:

1. In a planetary friction gear, the combination with rolling bodies, of cooperating race-rings forming a path therefor, the ring cooperating with one side of said rolling bodies deviating from circular shape so as to relieve said rolling bodies during each revolution.

2. In a planetary friction gear, the combination with rolling bodies, of cooperating race-rings forming a path therefor, the ring cooperating with one side of said rolling bodies being split and capable of deformation so as to relieve said rolling bodies during each revolution, the open joint of said ring being located in the zone of relief.

3. In a planetary friction gear, the combination with the rolling bodies, of cooperating race-rings therefor, the outer ring being split and deviating from circular shape so as to relieve said rolling bodies during each revolution, the open joint of said outer ring being located in the zone of relief.

4. In a planetary friction gear, the combination with the rolling bodies, of cooperating race-rings therefor, the outer ring being split and deviating from circular shape so as to relieve said rolling bodies during each revolution, the open joint of said outer ring being located in the zone of relief, and means for causing the deformation of said outer ring.

5. In a planetary friction gear, the combination with the rolling bodies, of cooperating race-rings therefor, the outer ring being split and deviating from circular shape so as to relieve said rolling bodies during each revolution, the open joint of said outer ring being located in the zone of relief, and means for causing the deformation of said outer ring, said means being actuated by the torque transmitted by said race-ring.

6. A friction gear, comprising rolling bodies and cooperating race rings, a cage containing said rolling bodies, a driving and a driven member, one of the race-rings deviating from circular shape so as to substantially relieve said rolling bodies at least once during each revolution.

7. A friction gear comprising cylindrical rolling bodies and cooperating race rings, a cage containing said rolling bodies, a driving shaft connected to one of said race rings, a driven shaft connected to said cage, the other race ring being split and deviating from circular shape so as to relieve said rolling bodies during each revolution.

In testimony whereof I affix my signature.

RICHARD ERBAN.